United States Patent
Choi et al.

(10) Patent No.: US 10,559,428 B2
(45) Date of Patent: Feb. 11, 2020

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-si, Gyeonggi-do (KR)

(72) Inventors: Hye Young Choi, Suwon-si (KR); Jae Yeol Choi, Suwon-si (KR); Hyun Hee Gu, Suwon-si (KR); Bum Su Kim, Suwon-si (KR)

(73) Assignee: SAMSUNG ELECTRO-MECHANICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 16/281,825

(22) Filed: Feb. 21, 2019

(65) Prior Publication Data
US 2019/0180941 A1   Jun. 13, 2019

Related U.S. Application Data

(63) Continuation of application No. 15/398,264, filed on Jan. 4, 2017, now abandoned.

(30) Foreign Application Priority Data

Apr. 5, 2016   (KR) .................. 10-2016-0041387

(51) Int. Cl.
*H01G 4/232* (2006.01)
*H01G 4/30* (2006.01)
*H01G 4/12* (2006.01)

(52) U.S. Cl.
CPC .............. *H01G 4/30* (2013.01); *H01G 4/232* (2013.01); *H01G 4/12* (2013.01); *H01G 4/2325* (2013.01)

(58) Field of Classification Search
CPC ........... H01G 4/228; H01G 4/232; H01G 4/30
See application file for complete search history.

(56) References Cited

U.S. PATENT DOCUMENTS

2011/0266040 A1   11/2011   Kim et al.
2012/0300361 A1   11/2012   Togashi
(Continued)

FOREIGN PATENT DOCUMENTS

JP         2013-165180 A        8/2013
KR    10-2011-0122008 A        11/2011
(Continued)

OTHER PUBLICATIONS

U.S. Final Office Action dated Oct. 22, 2018 issued in U.S. Appl. No. 15/398,264.
(Continued)

*Primary Examiner* — Eric W Thomas
(74) *Attorney, Agent, or Firm* — Morgan Lewis & Bockius LLP

(57) ABSTRACT

A multilayer ceramic electronic component includes: a ceramic body including dielectric layers and internal electrodes; and external electrodes disposed on external surfaces of the ceramic body, wherein the external electrodes include seed layers disposed on at least one surface of the ceramic body in a thickness direction, first electrode layers electrically connected to the internal electrodes and the seed layers, and plating layers disposed on the seed layers and the first electrode layers, respectively, and 0.8≤T2/T1≤1.2, where T1 is a thickness of each of the first electrode layers in a central region of the ceramic body in the thickness direction, and T2 is a thickness of each of the first electrode layers at a point at which an outermost internal electrode, among the internal electrodes, is positioned.

13 Claims, 4 Drawing Sheets

(56) References Cited

U.S. PATENT DOCUMENTS

2013/0182368 A1   7/2013   Jeon et al.
2013/0182369 A1   7/2013   Jeon et al.
2013/0208401 A1   8/2013   Shirakawa et al.
2015/0083475 A1   3/2015   Kim et al.
2015/0223340 A1   8/2015   Jung et al.

FOREIGN PATENT DOCUMENTS

KR   10-2013-0084852 A   7/2013
KR   10-2013-0084853 A   7/2013
KR   10-2015-0091677 A   8/2015

OTHER PUBLICATIONS

U.S. Non-Final Office Action dated Jun. 15, 2018 issued in U.S. Appl. No. 15/398,264.
Notice of Office Action dated Jun. 11, 2017, in corresponding Korean Patent Application No. 10-2016-0041387 (with English translation).

MULTILAYER CERAMIC ELECTRONIC COMPONENT AND METHOD OF MANUFACTURING THE SAME

CROSS-REFERENCE TO RELATED APPLICATION(S)

This application is continuation of U.S. patent application Ser. No. 15/398,264, filed on Jan. 4, 2017, which claims the benefit of priority to Korean Patent Application No. 10-2016-0041387, filed on Apr. 5, 2016 in the Korean Intellectual Property Office, the entire disclosures of which are incorporated herein by reference.

TECHNICAL FIELD

The present disclosure relates to a multilayer ceramic electronic component and a method of manufacturing the same.

BACKGROUND

In accordance with the recent trend towards the miniaturization of electronic products, multilayer ceramic electronic components have also been required to have a small size and high capacitance.

Therefore, various methods for decreasing thicknesses of dielectric layers and internal electrodes and increasing the number of dielectric layers and internal electrodes in multilayer ceramic electronic components have been attempted, and multilayer ceramic electronic components in which thicknesses of dielectric layers are decreased and numbers of stacked dielectric layers are increased have been recently manufactured.

In addition, as external electrodes have also been required to have a decreased thickness, a problem in which a plating solution permeates into a chip through the external electrodes having the decreased thickness may occur, such that it is technically difficult to miniaturize the multilayer ceramic electronic component.

Particularly, when shapes of the external electrodes are non-uniform, there is an increased risk that the plating solution will permeate through portions of the external electrodes having a reduced thickness, such that a problem may occur in terms of securing reliability.

When forming external electrodes using an existing dipping method, or the like, the external electrodes are formed on head surfaces corresponding to end surfaces of a ceramic body in a length direction, and four surfaces (hereinafter, referred to as "band surfaces") contacting the head surfaces, and it may be difficult to uniformly apply a paste for forming the external electrode due to generation of dispersion in the body and fluidity and viscosity of the paste, such that a difference in a thickness of the applied paste may be generated.

In addition, the plating solution may permeate through a portion of an external electrode in which the paste is thinly applied due to a decrease in density of the portion, reducing the reliability, and glass beading or blisters where glass is exposed to a surface may be generated in a location in which the paste is thickly applied, such that a thickness of a plating layer should be increased in order to solve a plating defect and a shape defect.

Therefore, when a thickness at which the paste for the external electrode is applied is thin and uniform, a formation area of the internal electrodes may be increased, such that capacitance may be significantly increased as compared to an existing capacitor having the same size. Therefore, research has been conducted into the technology described above.

SUMMARY

An aspect of the present disclosure may provide a high capacitance multilayer ceramic electronic component in which a thickness of an external electrode is thin and uniform, and a method of manufacturing the same.

According to an aspect of the present disclosure, a multilayer ceramic electronic component includes: a ceramic body including dielectric layers and internal electrodes stacked to be alternately exposed to a first end surface and a second end surface of the ceramic body with respective dielectric layers interposed therebetween; and external electrodes disposed on external surfaces of the ceramic body, wherein the external electrodes include seed layers disposed on at least one surface of the ceramic body in a thickness direction, first electrode layers connected to the internal electrodes and the seed layers, and plating layers disposed on the first electrode layers, respectively, and $0.8 \leq T2/T1 \leq 1.2$ in which T1 is a thickness of each of the first electrode layers in a central region of the ceramic body in the thickness direction and T2 is a thickness of each of the first electrode layers at a point at which an outermost internal electrode, among the internal electrodes, is positioned.

According to another aspect of the present disclosure, a multilayer ceramic electronic component comprises: a ceramic body in which a plurality of internal electrodes are stacked with respective dielectric layers interposed therebetween; external electrodes formed on external surfaces of the ceramic body to be connected to the internal electrodes. The external electrodes include seed layers formed on at least one surface of the ceramic body in a thickness direction, first electrode layers electrically connected to the internal electrodes, and plating layers disposed on the seed layers and the first electrode layers, and the electrode layers are formed on only the end surfaces of the ceramic body in a length direction of the ceramic body.

According to another aspect of the present disclosure, a method of manufacturing a multilayer ceramic electronic component includes: preparing a plurality of ceramic sheets; forming internal electrode patterns on the respective ceramic sheets using a conductive paste; stacking the ceramic sheets on which the internal electrode patterns are formed to form a ceramic body including internal electrodes disposed therein to face each other; forming seed layers on at least one surface of the ceramic body in a thickness direction; forming first electrode layers on a first end surface and a second end surface of the ceramic body, respectively, to be connected to the internal electrodes and connected to the seed layers; and forming plating layers on the first electrode layers and the seed layers to form external electrodes, wherein $0.8 \leq T2/T1 \leq 1.2$ in which T1 is a thickness of each of the first electrode layers in a central region of the ceramic body in the thickness direction and T2 is a thickness of each of the first electrode layers at a point at which an outermost internal electrode, among the internal electrodes, is positioned.

BRIEF DESCRIPTION OF THE DRAWINGS

The above and other aspects, features, and advantages of the present disclosure will be more clearly understood from the following detailed description taken in conjunction with the accompanying drawings, in which.

DETAILED DESCRIPTION

Figure 1:
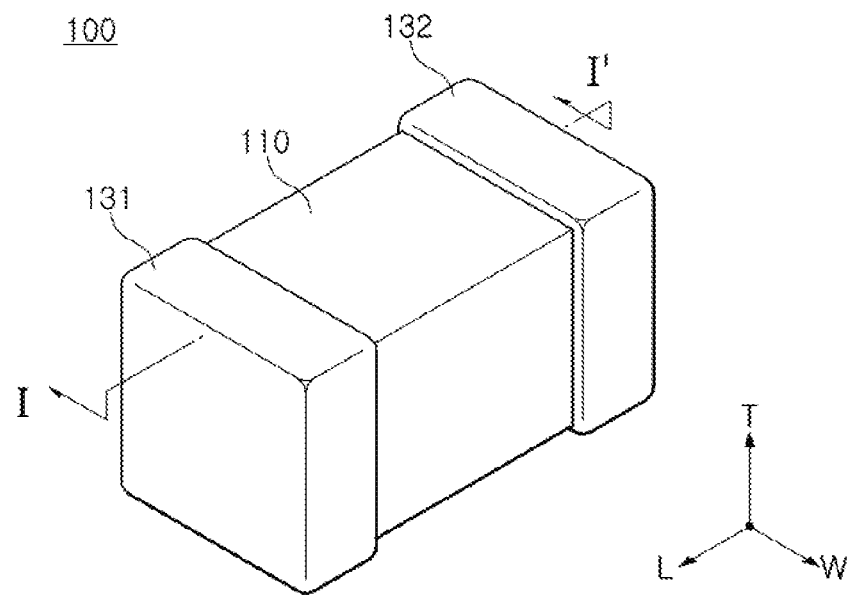
FIG. 1 is a perspective view illustrating a multilayer ceramic electronic component according to an exemplary embodiment in the present disclosure.

Hereinafter, exemplary embodiments of the present disclosure will be described in detail with reference to the accompanying drawings.

Directions of a hexahedron will be defined in order to clearly describe exemplary embodiments in the present disclosure. L, W and T illustrated in the drawings refer to a length direction, a width direction, and a thickness direction, respectively. Here, the thickness direction may be the same as a stacking direction in which dielectric layers are stacked.

Multilayer Ceramic Electronic Component

A multilayer ceramic electronic component according to an exemplary embodiment in the present disclosure, particularly, a multilayer ceramic capacitor will hereinafter be described. However, the multilayer ceramic electronic component according to the present disclosure is not limited thereto.

Figure 2:
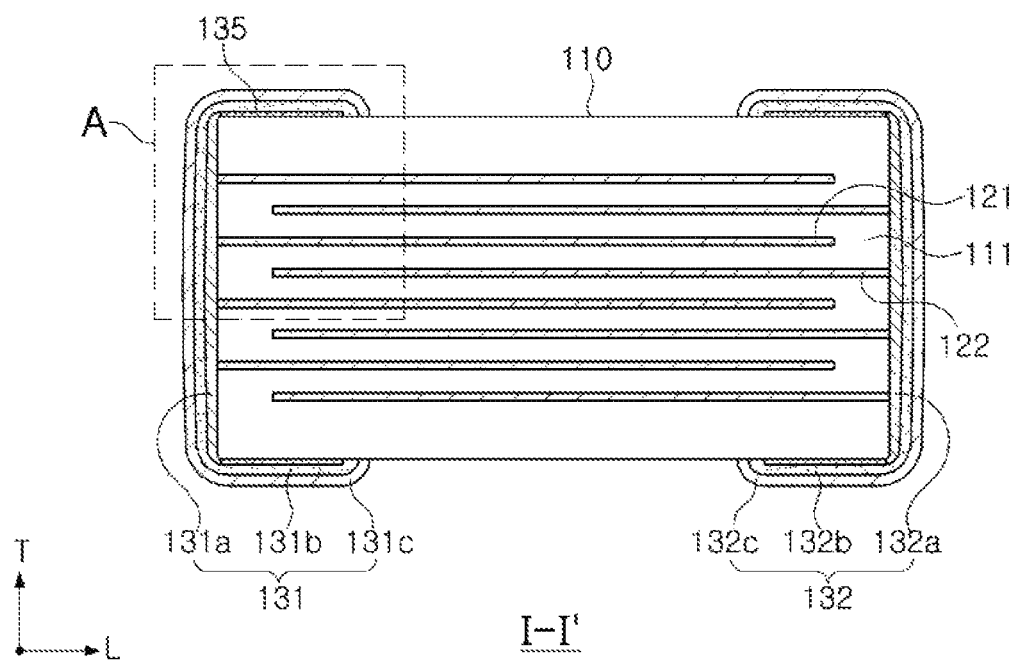
FIG. 2 is a cross-sectional view taken along line I-I' of FIG. 1.
Figure 3:
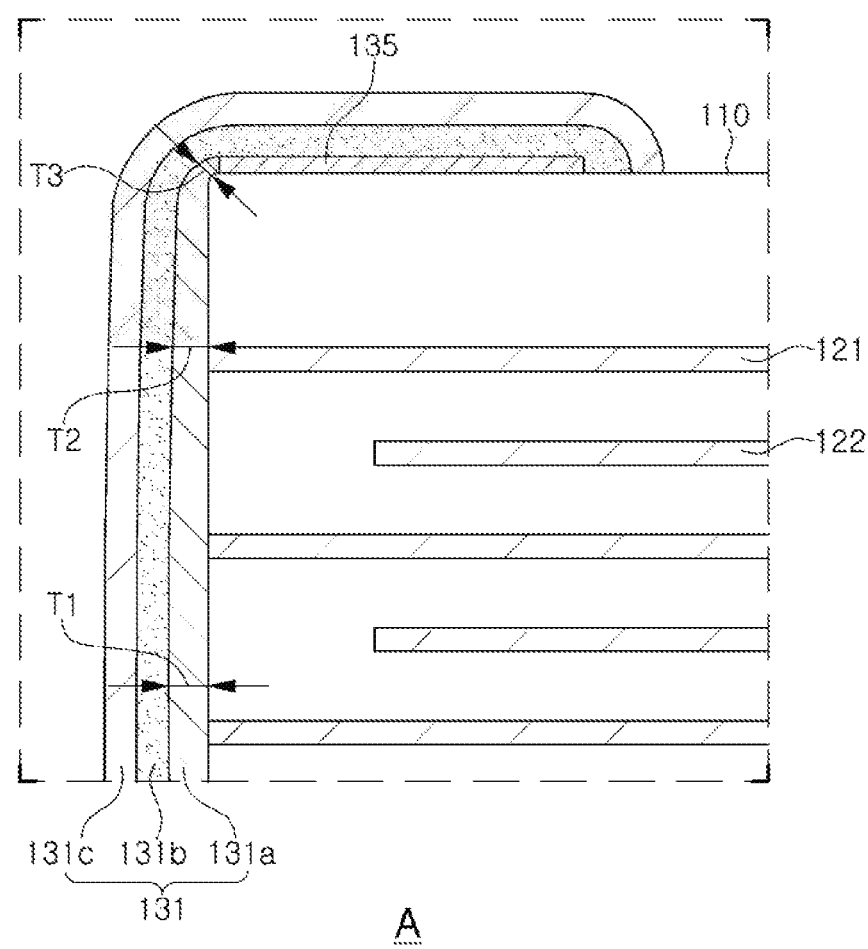
FIG. 3 is an enlarged view of region A of FIG. 2.

FIG. 1 is a perspective view illustrating a multilayer ceramic electronic component according to an exemplary embodiment in the present disclosure, FIG. 2 is a cross-sectional view taken along line I-I' of FIG. 1, and FIG. 3 is an enlarged view of region A of FIG. 2.

Referring to FIGS. 1 through 3, a multilayer ceramic electronic component 100 according to an exemplary embodiment in the present disclosure may include a ceramic body 110, internal electrodes 121 and 122, and external electrodes 131 and 132.

The ceramic body 110 may be formed of a hexahedron having first and second end surfaces in a length direction L, first and second surfaces in a width direction W, and first and second surfaces in a thickness direction T. The ceramic body 110 may be formed by stacking a plurality of dielectric layers 111 in the thickness direction T and then sintering the plurality of dielectric layers 111. A shape and a dimension of the ceramic body 110 and the number of stacked dielectric layers 111 are not limited to those of an example illustrated in the present exemplary embodiment.

In addition, the plurality of dielectric layers 111 forming the ceramic body 110 may be in a sintered state, and adjacent dielectric layers 111 may be integrated with each other so that boundaries therebetween may not be readily apparent without the use of a scanning electron microscope (SEM).

The dielectric layer 111 may have a thickness arbitrarily changed in accordance with a capacitance design of the multilayer ceramic electronic component 100, and may include ceramic powder particles having a high dielectric constant, such as barium titanate ($BaTiO_3$) based powder particles or strontium titanate ($SrTiO_3$) based powder particles. However, a material of the dielectric layer 111 according to the present disclosure is not limited thereto. In addition, various ceramic additives, organic solvents, plasticizers, binders, dispersants, and the like, may be added to the ceramic powder particles according to an object of the present disclosure.

An average particle size of the ceramic powder particles used to form the dielectric layer 111 is not particularly limited, but may be controlled in order to accomplish an object of the present disclosure. For example, the average particle size of the ceramic powder particles used to form the dielectric layer 111 may be controlled to be 400 nm or less.

The internal electrodes 121 and 122 may include a plurality of first internal electrodes 121 and second internal electrodes 122 provided in pairs and having different polarities, and may be formed at a predetermined thickness with each of the plurality of dielectric layers 111 stacked in the thickness direction T of the ceramic body 110 interposed therebetween.

The first internal electrodes 121 and the second internal electrodes 122 may be formed to be alternately exposed to the first and second end surfaces of the ceramic body 110 in the length direction L of the ceramic body 110 in a stacking direction of the dielectric layers 111 by printing a conductive paste including a conductive metal, and may be electrically insulated from each other by respective dielectric layers 111 disposed therebetween.

That is, the first and second internal electrodes 121 and 122 may be electrically connected to the first and second external electrodes 131 and 132 formed on the first and second end surfaces of the ceramic body 110 in the length direction L of the ceramic body 110 through portions alternately exposed to the first end surface and the second end surface of the ceramic body 110 in the length direction of the ceramic body 110, respectively.

Therefore, when voltages are applied to the first and second external electrodes 131 and 132, electric charges may be accumulated between the first and second internal electrodes 121 and 122 facing each other. In this case, capacitance of the multilayer ceramic capacitor 100 may be in proportion to an area of a region in which the first and second internal electrodes 121 and 122 overlap each other.

That is, when the area of the region in which the first and second internal electrodes 121 and 122 overlap each other is significantly increased, capacitance may be significantly increased even in a capacitor having the same size.

According to the exemplary embodiment, since thicknesses of the external electrodes are thin and uniform, an area in which the internal electrodes overlap each other may be significantly increased, such that a high capacitance multilayer ceramic capacitor may be implemented.

Widths of the first and second internal electrodes 121 and 122 may be determined depending on a use of the multilayer ceramic capacitor. For example, the widths of the first and second internal electrodes 121 and 122 may be determined to be in a range of 0.2 to 1.0 μm in consideration of a size of the ceramic body 110. However, the widths of the first and second internal electrodes 121 and 122 according to the present disclosure are not limited thereto.

In addition, the conductive metal included in the conductive paste forming the first and second internal electrodes 121 and 122 may be nickel (Ni), copper (Cu), palladium (Pd), silver (Ag), lead (Pb), platinum (Pt) or alloys thereof. However, the conductive metal according to the present disclosure is not limited thereto.

The external electrodes 131 and 132 may include a first external electrode 131 and a second external electrode 132 disposed on external surfaces of the ceramic body 110.

The external electrodes 131 and 132 may include seed layers 135, first electrode layers 131a and 132a and plating layers 131b, 131c, 132b, and 132c, as illustrated in FIG. 2.

The first external electrode 131 may include the seed layer 135 disposed on at least one surface of the ceramic body 110 in the thickness direction T, the first electrode layer 131a electrically connected to the first internal electrodes 121 and the seed layer 135, and the plating layers 131b and 131c disposed on the seed layer 135 and the first electrode layer 131a.

In addition, the second external electrode 132 may include the seed layer 135 disposed on at least one surface of the ceramic body 110 in the thickness direction T, the first electrode layer 132a electrically connected to the second internal electrodes 122 and the seed layer 135, and the plating layers 132b and 132c disposed on the seed layer 135 and the first electrode layer 132a.

The seed layers 135 may be formed at a predetermined thickness on the at least one surface of the ceramic body 110 in the thickness direction T by sputtering or depositing a conductive metal, and may be divided and formed on both end portions of the one surface of the ceramic body 110 in the thickness direction T, respectively, and may not be formed on both surfaces of the ceramic body 110 in the width direction of the ceramic body 110.

The seed layers 135 may also be formed on the at least one surface of the ceramic body 110 in the thickness direction T by printing a conductive paste including a conductive metal.

The seed layers 135 may include first and second seed layers formed on a first surface of the ceramic body 110 in the thickness direction, and third and fourth seed layers formed on a second surface of the ceramic body 110 in the thickness direction. The first and second seed layers may be disposed at opposite ends of the first surface of the ceramic body 110 in the thickness direction, and the third and fourth seed layers may be disposed at opposite ends of the second surface of the ceramic body 110 in the thickness direction.

The conductive metal included in the conductive paste forming the seed layers 135 may be the same as that of the first and second internal electrodes 121 and 122, but is not limited thereto. For example, the conductive metal may be copper (Cu), nickel (Ni), palladium (Pd), platinum (Pt), gold (Au), silver (Ag), lead (Pb), or alloys thereof.

As a method of forming an external electrode according to the related art, a method of dipping the ceramic body 110 in a paste including a metal component has mainly been used.

In a case in which the external electrode is formed by the dipping method, the paste for the external electrode may not be uniformly applied due to fluidity and viscosity of the paste, such that a difference in a thickness between a central portion and a corner portion of the external electrode in which the paste is applied is generated.

When the thickness of the external electrode is not uniform as described above, glass beading or blisters may be generated in the central portion in which the paste is applied at a thick thickness to cause a plating defect and a shape defect, and the corner portion in which the paste is applied at a thin thickness is vulnerable to permeation of a plating solution, such that reliability may be deteriorated.

In addition, in a case of complementing the corner portion vulnerable to the plating solution, a thickness of the central portion in which the paste is applied may inevitably be increased, and there is a limitation in increasing a size of a ceramic capacitor in order to increase capacitance.

Therefore, in the exemplary embodiment in the present disclosure, the seed layers 135 may be formed on the at least one surface of the ceramic body 110 in the thickness direction T, such that the seed layers 135 may be disposed on the at least one surface of the ceramic body 110 in the thickness direction T and the plating layers 131b, 131c, 132b, and 132c may be disposed on the seed layers 135.

In addition, the first electrode layers 131a and 132a may be disposed on first and second end surfaces of the ceramic body 110 in the length direction L of the ceramic body 110, respectively, among external surfaces of the ceramic body 110, and may not be formed on both surfaces of the ceramic body 110 in the width direction of the ceramic body 110. However, the first electrode layers 131a and 132a are not limited thereto.

Therefore, the first electrode layers 131a and 132a may be disposed on the first and second end surfaces of the ceramic body 110 in the length direction L of the ceramic body 110, respectively, and the plating layers 131b, 131c, 132b, and 132c may be disposed on the first electrode layers 131a and 132a. Therefore, the first and second external electrodes 131 and 132 may not be formed on both surfaces of the ceramic body 110 in the width direction of the ceramic body 110.

According to the exemplary embodiment, the first electrode layers 131a and 132a may be disposed on the first and second end surfaces of the ceramic body 110 in the length direction L of the ceramic body 110, respectively, and may also extend to portions of upper surfaces of the seed layers 135, respectively.

Since the first electrode layers 131a and 132a are not formed by the dipping method according to the related art, the first electrode layers 131a and 132a may be formed on head surfaces corresponding to the end surfaces of the ceramic body 110 in the length direction L of the ceramic body, and may or may not be formed at sizes as small as possible on all of band surfaces corresponding to four surfaces contacting the head surfaces. Therefore, the external electrodes may be formed at thin and uniform thicknesses.

Therefore, formation areas of the internal electrodes may be increased, such that areas in which the internal electrodes overlap each other may be significantly increased, whereby a high capacitance multilayer ceramic capacitor may be implemented.

According to the exemplary embodiment, the first electrode layers 131a and 132a may be formed by a sheet transfer method or a pad transfer method unlike the dipping method according to the related art, detailed contents of which will be described below.

Particularly, in the exemplary embodiment in the present disclosure, the first electrode layers 131a and 132a do not cover the upper surfaces of the seed layers 135, but may be connected to the seed layers 135 in corner portions of the ceramic body 110.

That is, the electrode layers 131a and 132a may be electrically connected to the seed layers 135 in the corner portions of the ceramic body 110, such that thicknesses of the external electrodes 131 and 132 may be further reduced. Therefore, formation areas of the internal electrodes may be further increased in a multilayer ceramic capacitor having the same size. Resultantly, areas in which the internal electrodes overlap each other may be increased, whereby a higher capacitance capacitor may be implemented.

Referring to FIGS. 2 and 3, it may be appreciated that the first electrode layers 131a and 132a are electrically connected to the seed layers 135 in the corner portions of the ceramic body 110.

The first electrode layers 131a and 132a may be formed of the same conductive metal as that of the first and second internal electrodes 121 and 122, but are not limited thereto. For example, the first electrode layers 131a and 132a may be formed of copper (Cu), silver (Ag), nickel (Ni), or alloys thereof.

The plating layers 131b, 131c, 132b, and 132c may be disposed on the seed layers 135 and the first electrode layers 131a and 132a.

That is, the plating layers 131b, 131c, 132b, and 132c may be disposed on the first electrode layers 131a and 132a on the head surfaces corresponding to the end surfaces of the ceramic body 110 in the length direction L of the ceramic body 110, and be disposed on the seed layers 135 on the at least one surface of the ceramic body 110 in the thickness direction T.

Particularly, according to the exemplary embodiment, the first electrode layers 131a and 132a are not formed by the dipping method according to the related art, and may thus be formed on the head surfaces corresponding to the end surfaces of the ceramic body 110 in the length direction L of the ceramic body 110, and the seed layers 135 may be formed on the at least one surface of the ceramic body 110 in the thickness direction T.

Therefore, the plating layers 131b, 131c, 132b, and 132c may be formed on the head surfaces corresponding to the end surfaces of the ceramic body 110 in the length direction L of the ceramic body 110 and on the at least one surface of the ceramic body 110 in the thickness T of the ceramic body 110, and may not be formed on both surfaces of the ceramic body 110 in the width direction of the ceramic body 110.

The plating layers 131b, 131c, 132b, and 132c may include nickel plating layers 131b and 132b and tin plating layers 131c and 132c each disposed on the nickel plating layers 131b and 132b, but are not limited thereto.

According to the present exemplary embodiment, when a thickness of each of the first electrode layers 131a and 132a in a central region of the ceramic body 110 in the thickness direction of the ceramic body 110 is T1 and a thickness of each of the first electrode layers 131a and 132a at a point at which the outermost internal electrode 121 among the internal electrodes 121 and 122 is positioned is T2, $0.8 \leq T2/T1 \leq 1.2$.

The thickness T1 of each of the first electrode layers 131a and 132a in the central region of the ceramic body 110 in the thickness direction of the ceramic body 110 refers to a thickness of each of the first electrode layers 131a and 132a at a point at which a virtual line drawn from a central point of the ceramic body 110 in the thickness direction of the ceramic body 110 in the length direction of the ceramic body 110 meets.

Likewise, the thickness T2 of each of the first electrode layers 131a and 132a at the point at which the outermost internal electrode 121 among the internal electrodes 121 and 122 is positioned refers to a thickness of each of the first electrode layers 131a and 132a that a virtual line drawn from a position of an internal electrode disposed in the outermost portion of the ceramic body 110 in the thickness direction of the ceramic body 110 in the length direction of the ceramic body 110 meets.

When $0.8 \leq T2/T1 \leq 1.2$, there is a reduced deviation between the thickness T1 of each of the first electrode layers 131a and 132a in the central region of the ceramic body 110 in the thickness direction of the ceramic body 110 and the thickness T2 of each of the first electrode layers 131a and 132a at the point at which the outermost internal electrode 121 among the internal electrodes 121 and 122 is positioned, whereby a deterioration in the reliability may be prevented.

When T2/T1 is less than 0.8 or exceeds 1.2, a deviation between thicknesses of the first electrode layers 131a and 132a may be large, such that a plating solution may permeate into a portion having a thin thickness, thereby deteriorating reliability.

According to the exemplary embodiment, when a thickness of each of the first electrode layers 131a and 132a in corner portions of the ceramic body 110 is T3, $0.4 \leq T3/T1 \leq 1.0$.

The thickness T3 of each of the first electrode layers 131a and 132a in the corner portions of the ceramic body 110 refers to a thickness of each of the first electrode layers 131a and 132a formed on corner regions of the ceramic body 110.

When $0.4 \leq T3/T1 \leq 1.0$, there is a reduced deviation between the thickness T1 of each of the first electrode layers 131a and 132a in the central region of the ceramic body 110 in the thickness direction of the ceramic body 110 and the thickness T3 of each of the first electrode layers 131a and 132a in the corner portions of the ceramic body 110, whereby a deterioration in the reliability may be prevented.

When T3/T1 is less than 0.4 or exceeds 1.0, a deviation between thicknesses of the first electrode layers 131a and 132a is large, such that a plating solution may permeate into a portion having a thin thickness, thereby deteriorating reliability.

Figure 4:
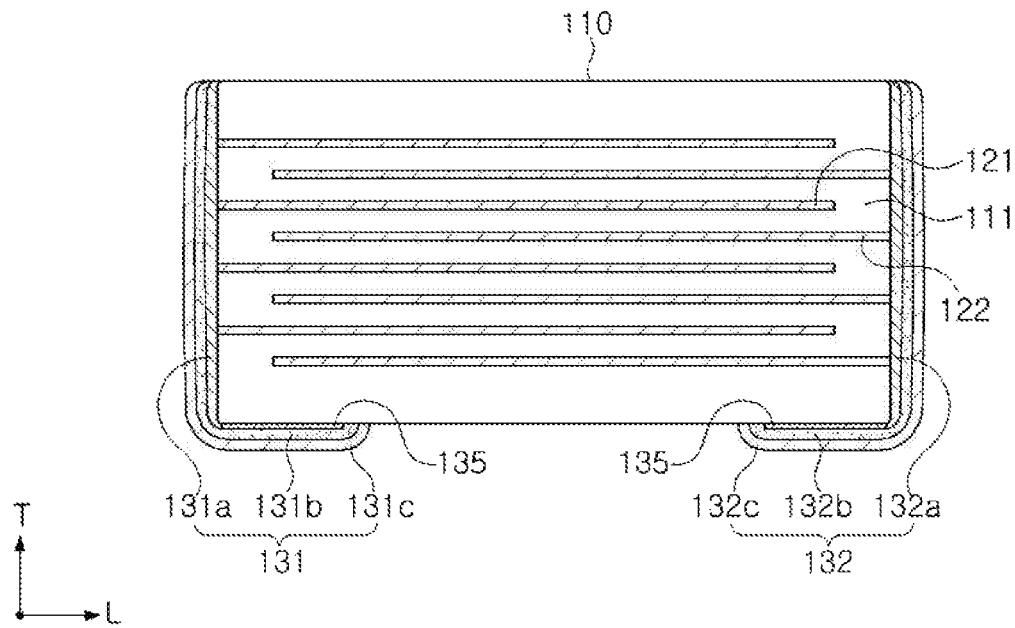
FIG. 4 is a cross-sectional view of a multilayer ceramic electronic component according to another exemplary embodiment in the present disclosure.

FIG. 4 is a cross-sectional view of a multilayer ceramic electronic component according to another exemplary embodiment in the present disclosure.

Referring to FIG. 4, in a multilayer ceramic capacitor according to another exemplary embodiment in the present disclosure, the seed layers 135 may only be disposed on one surface of the ceramic body 110 in the thickness direction T.

The one surface of the ceramic body 110 in the thickness direction T may be amounting surface of the multilayer ceramic capacitor when the multilayer ceramic capacitor is mounted on a board.

The plating layers 131b, 131c, 132b, and 132c may be disposed on the first and second end surfaces of the ceramic body in the length direction 110 and may extend to the one surface of the ceramic body 110 in the thickness direction T.

The plating layers 131b, 131c, 132b, and 132c may be disposed on the seed layers 135 only disposed on the one surface of the ceramic body 110 in the thickness direction T and the first electrode layers 131a and 132a disposed on the first and second end surfaces of the ceramic body 110 in the length direction of the ceramic body 110.

That is, the plating layers 131b, 131c, 132b, and 132c may be disposed on the first electrode layers 131a and 132a on the head surfaces corresponding to the end surfaces of the ceramic body 110 in the length direction L of the ceramic body 110, and be disposed on the seed layers 135 on the one surface of the ceramic body 110 in the thickness direction T.

Particularly, according to the present exemplary embodiment in the present disclosure, the first electrode layers 131a and 132a are not formed by the dipping method according to the related art, and may thus be formed on the head surfaces corresponding to the end surfaces of the ceramic body 110 in the length direction L of the ceramic body 110, and the seed layers 135 may be formed on only the one surface of the ceramic body 110 in the thickness direction T.

Therefore, the plating layers 131b, 131c, 132b, and 132c may be formed on the head surfaces corresponding to the end surfaces of the ceramic body 110 in the length direction L of the ceramic body 110 and on the one surface of the ceramic body 110 in the thickness T of the ceramic body 110, and may not be formed on both surfaces of the ceramic body 110 in the width direction of the ceramic body 110.

According to the present exemplary embodiment in the present disclosure, thicknesses of the external electrodes including the plating layers may be further reduced, such that capacitance may be further increased.

Method of Manufacturing Multilayer Ceramic Electronic Component

Figure 5A:
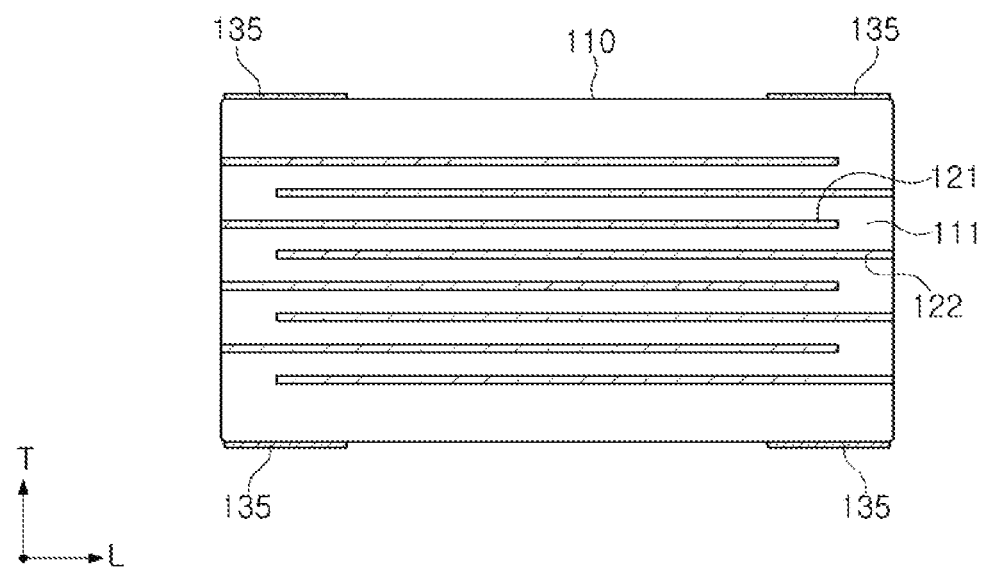
FIGS. 5A through 5C are views illustrating processes of forming external electrodes of a multilayer ceramic electronic component according to an exemplary embodiment in the present disclosure.
Figure 5B:
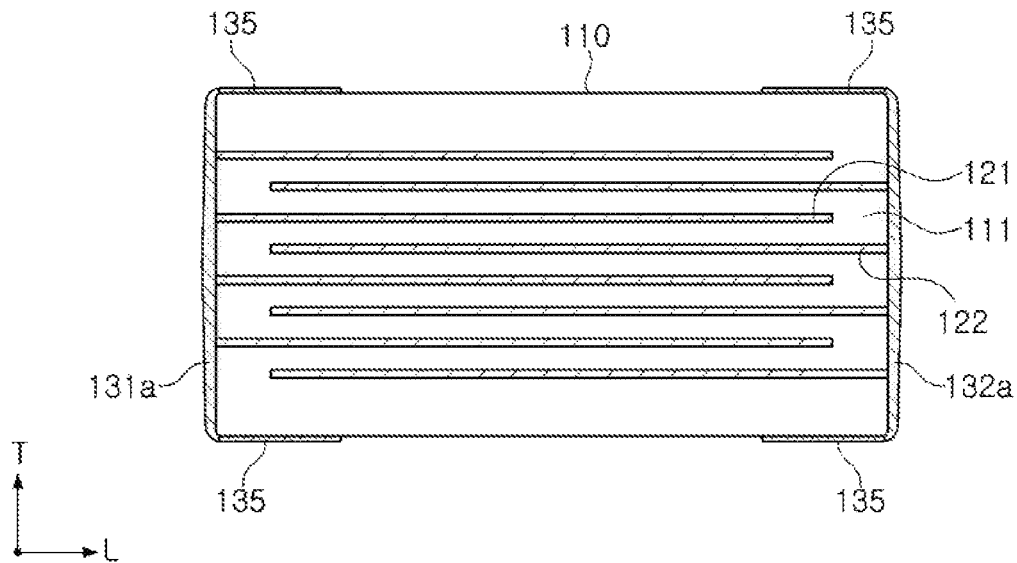
Figure 5C:
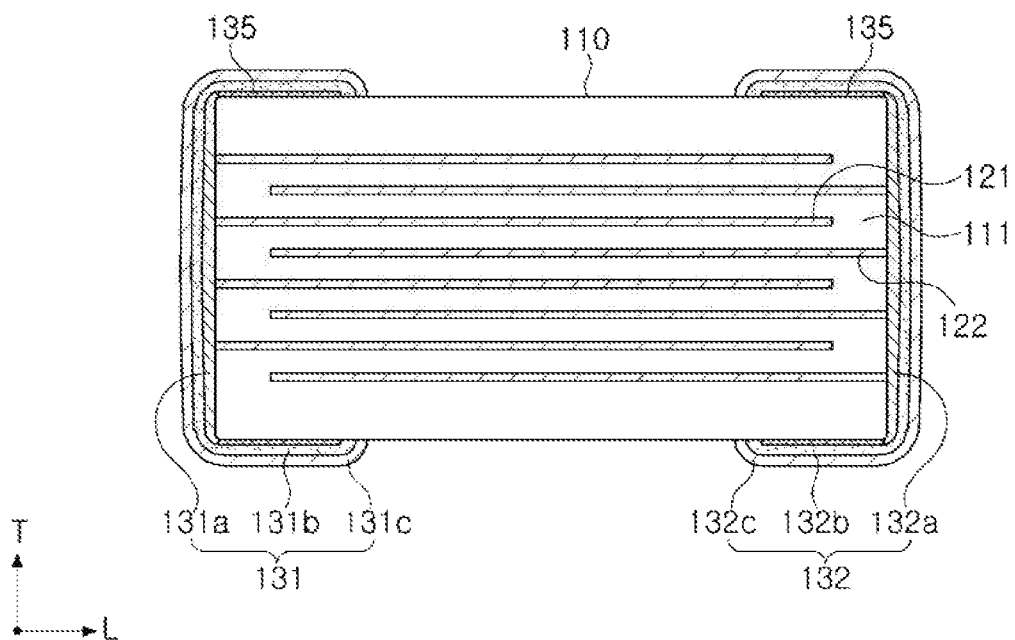

FIGS. 5A through 5C are views illustrating a process of forming an external electrode of a multilayer ceramic electronic component according to an exemplary embodiment in the present disclosure.

In the method of manufacturing a multilayer ceramic electronic component according to the present exemplary embodiment, a slurry including powder particles such as barium titanate ($BaTiO_3$) powder particles, or the like, may be first applied to carrier films and dried to prepare a plurality of ceramic sheets, thereby forming dielectric layers.

The ceramic sheets may be manufactured by mixing ceramic powder particles, a binder, and a solvent with each other to prepare a slurry and manufacturing the slurry in a sheet shape having a thickness of several micrometers by a doctor blade method.

Then, a conductive paste including conductive metal powder particles may be prepared. The conductive metal powder particles may be powder particles of nickel (Ni), copper (Cu), palladium (Pd), silver (Ag), lead (Pb), or platinum (Pt), or alloys thereof, may have an average particle size of 0.1 to 0.2 μm, and a conductive paste for an internal electrode including 40 to 50 wt % of the conductive metal powder particles may be prepared.

The conductive paste for an internal electrode may be applied to the ceramic sheets by a printing method, or the like, to form internal electrode patterns. A method of printing the conductive paste may be a screen printing method, a gravure printing method, or the like, but is not limited thereto. Two hundred or three hundred ceramic sheets on which the internal electrode patterns are printed may be stacked, pressed, and sintered to manufacture the ceramic body.

FIGS. 5A through 5C are views illustrating a process of forming external electrodes of a multilayer ceramic electronic component according to the present exemplary embodiment in the present disclosure.

Referring to FIG. 5A, the seed layers 135 may be formed on at least one surface of the ceramic body 110 in the thickness direction of the ceramic body 110 using a conductive paste. A conductive metal included in the conductive paste forming the seed layers 135 may be the same as that of the internal electrodes, but is not limited thereto. For example, the conductive metal may be copper (Cu), nickel (Ni), palladium (Pd), platinum (Pt), gold (Au), silver (Ag), lead (Pb), or alloys thereof.

The seed layers 135 may be divided and formed on both end portions of the at least one surface of the ceramic body 110 in the thickness direction T by a printing method, or the like, using the conductive paste. A method of forming the seed layers 135 may be, for example a screen printing method, a gravure printing method, or the like. However, the method of forming the seed layers is not limited thereto, but may also be a sputtering method or a depositing method.

Referring to FIG. 5B, the first electrode layers 131a and 132a may be formed on the first and second end surfaces of the ceramic body 110 in the length direction of the ceramic body 110, respectively, so as to contact and be electrically connected to the internal electrodes 121 and 122 exposed to the first and second end surfaces of the ceramic body 110 in the length direction of the ceramic body 110, respectively.

The first electrode layers 131a and 132a may be formed of the same conductive material as that of the internal electrodes, but are not limited thereto. For example, the first electrode layers 131a and 132a may be formed of copper (Cu), silver (Ag), nickel (Ni), or alloys thereof.

The first electrode layers 131a and 132a may be formed on the first and second end surfaces of the ceramic body 110 in the length direction of the ceramic body 110, respectively, by the sheet transfer method or the pad transfer method unlike the dipping method according to the related art.

In detail, sheets or pads for forming first electrode layers are positioned on a pressing rubber on a surface plate, and the ceramic body is closely adhered to the sheets or the pads while applying pressure to the sheets or the pads, thereby attaching the sheets or the pads for forming first electrode layers onto the ceramic body.

In this case, heat may be applied to the surface plate to increase ductility of the sheets, thereby increasing adhesion between the ceramic body and the sheets while attaching the sheets onto the ceramic body to extend from the head surfaces corresponding to the end surfaces of the ceramic body in the length direction to the band surfaces of the ceramic body on which the seed layers are formed.

Then, the ceramic body onto which the sheets are attached is pressed to a punching rubber on the surface plate in order to remove unnecessary portions of the sheets attached to the ceramic body, thereby removing portions of the sheets that are not attached to the ceramic body by elasticity of the punching rubber.

In another method, sheets for forming first electrode layers onto which polyethylene terephthalate (PET) films are attached are positioned on a pressing rubber on a surface plate, and the ceramic body is closely adhered to the sheets while applying pressure the sheets, thereby attaching the sheets for forming first electrode layers onto the ceramic body.

In this case, the sheets are cut in corner portions of the ceramic body by the PET films, and are attached to only head surfaces of the ceramic body at the time of removing the pressure.

In this case, portions of the sheets that are not attached to the ceramic body remain on the PET films, such that a separate process of removing unnecessary sheets may be omitted.

According to the method described above, the first electrode layers may be formed on the head surfaces corresponding to the first and second end surfaces of the ceramic body in the length direction, and may be connected to the seed layers formed on the one surface of the ceramic body in the thickness direction, such that thicknesses of the external electrodes may be further reduced, whereby a high capacitance multilayer ceramic capacitor may be implemented.

Referring to FIG. 5C, the plating layers 131b, 131c, 132b, and 132c may be formed on the seed layers 135 by a plating method on band surfaces of the external electrodes 131 and 132, and the plating layers 131b, 131c, 132b, and 132c may also be formed on the first electrode layers 131a and 132a formed on the first and second end surfaces of the ceramic body 110 in the length direction L of the ceramic body 110, respectively.

That is, the plating layers 131b, 131c, 132b, and 132c may be formed on the first electrode layers 131a and 132a on the head surfaces corresponding to the end surfaces of the ceramic body 110 in the length direction L of the ceramic body 110, and may be formed on the seed layers 135 on the at least one surface of the ceramic body 110 in the thickness direction T.

Particularly, according to the present exemplary embodiment, the first electrode layers 131a and 132a are not formed by the dipping method according to the related art, and may thus be formed on the head surfaces corresponding to the end surfaces of the ceramic body 110 in the length direction L of the ceramic body 110, and the seed layers 135 may be formed on the at least one surface of the ceramic body 110 in the thickness direction T.

Therefore, the plating layers 131b, 131c, 132b, and 132c may be formed on the head surfaces corresponding to the end surfaces of the ceramic body 110 in the length direction L of the ceramic body 110 and on the at least one surface of the ceramic body 110 in the thickness T of the ceramic body 110, and may not be formed on both surfaces of the ceramic body 110 in the width direction of the ceramic body 110.

The plating layers 131b, 131c, 132b, and 132c may include nickel plating layers 131b and 132b and tin plating layers 131c and 132c each disposed on the nickel plating layers 131b and 132b, but are not limited thereto.

Contents overlapping those described in the multilayer ceramic electronic component according to the exemplary embodiment described above will be omitted.

As set forth above, in the multilayer ceramic electronic component according to the exemplary embodiment in the present disclosure, the external electrodes may have a thin and uniform thickness, and thus, formation areas of the internal electrodes may be increased, such that areas in which the internal electrodes overlap each other may be significantly increased, whereby a high capacitance multilayer ceramic electronic component may be implemented.

In addition, a deviation between thicknesses depending on positions of the external electrodes may be reduced, whereby a subminiature high capacitance multilayer ceramic capacitor having excellent reliability may be implemented.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including dielectric layers and internal electrodes stacked to be alternately exposed to a first end surface and a second end surface of the ceramic body with respective dielectric layers interposed therebetween; and
external electrodes disposed on external surfaces of the ceramic body,
wherein the external electrodes include seed layers disposed on at least one surface of the ceramic body in a thickness direction, first electrode layers electrically connected to the internal electrodes and the seed layers, and plating layers disposed on the seed layers and the first electrode layers, respectively,
$0.8 \leq T2/T1 \leq 1.2$, where T1 is a thickness of each of the first electrode layers in a central region of the ceramic body in the thickness direction, and T2 is a thickness of each of the first electrode layers at a point at which an outermost internal electrode, among the internal electrodes, is positioned, and
the first electrode layers are connected to the seed layers in contact portions between the at least one surface of the ceramic body in the thickness direction and the at least one surface of the ceramic body in a length direction,
wherein the first electrode layers and the seed layers directly contact each other without a gap.

2. The multilayer ceramic electronic component of claim 1, wherein the first electrode layers and the seed layers are connected to each other in corner portions of the ceramic body.

3. The multilayer ceramic electronic component of claim 1, wherein $0.4 \leq T3/T1 \leq 1.0$, where T3 is a thickness of each of the first electrode layers in corner portions of the ceramic body.

4. The multilayer ceramic electronic component of claim 1, wherein the first electrode layers are disposed on first and second end surfaces of the ceramic body in a length direction, respectively.

5. The multilayer ceramic electronic component of claim 1, wherein the first electrode layers extend to portions of upper surfaces of the seed layers.

6. The multilayer ceramic electronic component of claim 1, wherein the seed layers are only disposed on one surface of the ceramic body in the thickness direction.

7. The multilayer ceramic electronic component of claim 6, wherein the one surface of the ceramic body in the thickness direction is a mounting surface of the multilayer ceramic electronic component mounted on a board.

8. The multilayer ceramic electronic component of claim 6, wherein the plating layers are disposed on first and second end surfaces of the ceramic body in a length direction, and extend to the one surface of the ceramic body in the thickness direction.

9. A multilayer ceramic electronic component comprising:
a ceramic body in which a plurality of internal electrodes are stacked with respective dielectric layers interposed therebetween; and
external electrodes formed on surfaces of the ceramic body to be connected to the internal electrodes,
wherein the external electrodes include seed layers formed on at least one surface of the ceramic body in a thickness direction, first electrode layers electrically connected to the internal electrodes, and plating layers disposed on the seed layers and the first electrode layers,
the first electrode layers are formed on only end surfaces of the ceramic body in a length direction of the ceramic body, and
the first electrode layers and the seed layers directly contact each other without a gap.

10. The multilayer ceramic electronic component of claim 9, wherein $0.8 \leq T2/T1 \leq 1.2$, where T1 is a thickness of each of the first electrode layers in a central region of the ceramic body in the thickness direction, and T2 is a thickness of each of the first electrode layers at a point at which an outermost internal electrode, among the internal electrodes, is positioned.

11. The multilayer ceramic electronic component of claim 9, wherein $0.4 \leq T3/T1 \leq 1.0$, where T3 is a thickness of each of the first electrode layers in corner portions of the ceramic body.

12. The multilayer ceramic electronic component of claim 9, wherein the external electrodes are not formed on both surfaces of the ceramic body in the width direction of the ceramic body.

13. The multilayer ceramic electronic component of claim 9, wherein the seed layers include first and second seed layers formed on a top surface of the ceramic body in the thickness direction, and third and fourth seed layers formed on a bottom surface of the ceramic body in the thickness direction, the first and second seed layers are disposed at opposite ends of the top surface of the ceramic body in the thickness direction, and the third and fourth seed layers are disposed at opposite ends of the bottom surface of the ceramic body in the thickness direction.

\* \* \* \* \*